Patented July 31, 1945

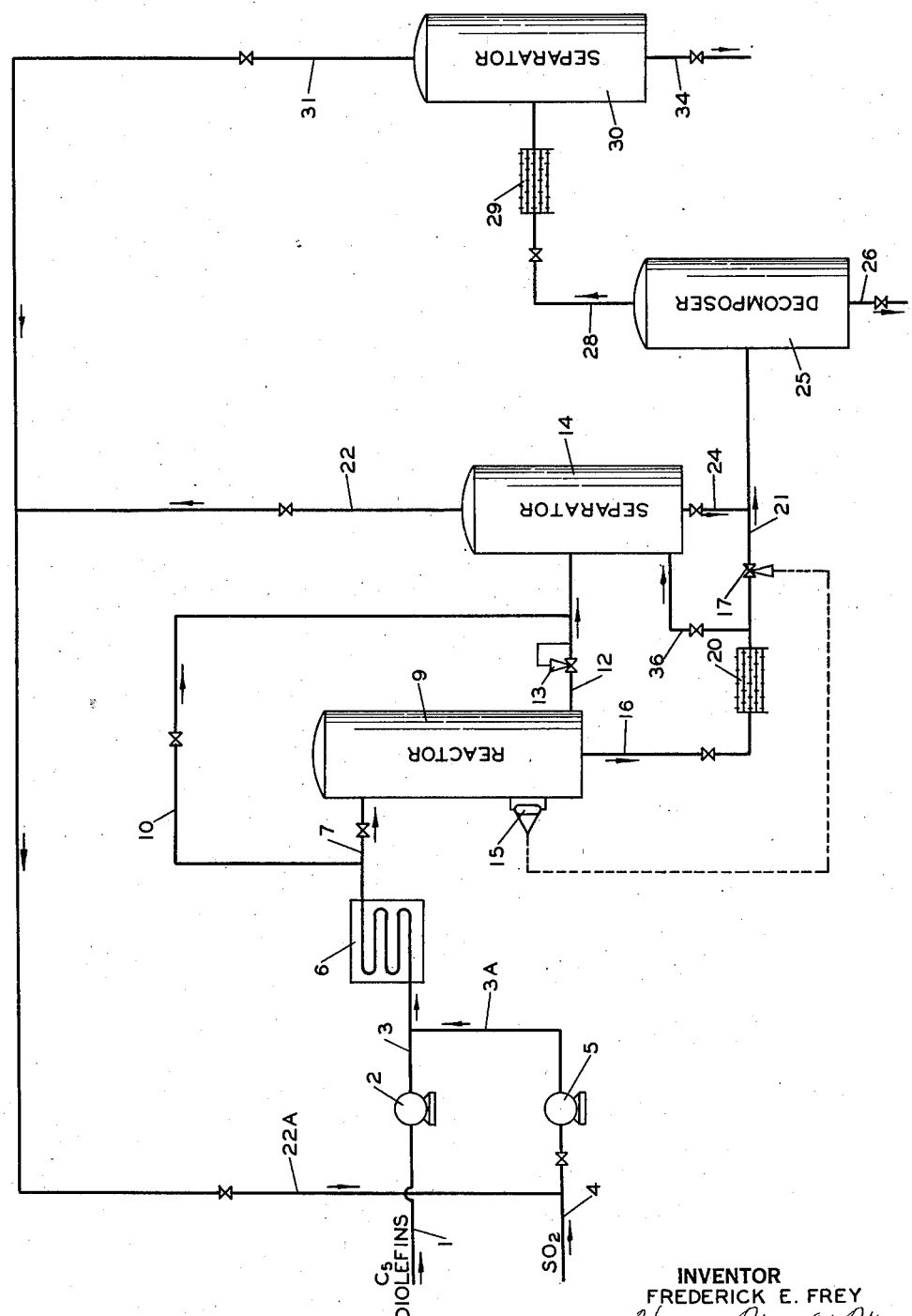

2,380,831

UNITED STATES PATENT OFFICE 2,380,831

PURIFICATION OF ALIPHATIC CONJUGATED DIOLEFINS

Frederick E. Frey, Bartlesville, Okla., assignor to Phillips Petroleum Company, a corporation of Delaware Application December 20, 1941, Serial No. 423,851

4 Claims. (Cl. 260—681.5)

This invention relates to a process for the recovery of conjugated diolefin hydrocarbons in concentrated form from mixtures with near-boiling hydrocarbons and more particularly to such a process in which aliphatic conjugated pentadienes are recovered in a state of purity suitable for conversion into synthetic rubber and/or other polymers.

Isoprene and both the high and the low-boiling isomers of piperylene have been used in the manufacture of polymers of the synthetic rubber and other types. The purity of these aliphatic conjugated diolefins varies with the processes by which they are prepared. By catalytic dehydrogenation of pentanes (strictly aliphatic) and in other ways, it is possible to obtain the diolefins in a relatively high state of purity, virtually free from related cyclic compounds. However, thermal processes for their manufacture, such as direct pyrolysis of light hydrocarbons, and related processes involving a similar chemistry, result in the formation of substantial amounts of cyclopentadiene and cyclopentene together with aliphatic $C^5$ hydrocarbons which include the aliphatic conjugated pentadienes.

Thus cyclopentadiene is a frequently encountered undesirable component in aliphatic conjugated pentadienes to be used for synthetic purposes. The principal object of my invention is to produce from a crude $C_5$ material, aliphatic conjugated pentadienes, substantially free from other aliphatic $C_5$ hydrocarbons and from cyclopentadiene and cyclopentene.

A further object of my invention is to prepare aliphatic, conjugated pentadienes in a high state of purity.

Numerous other objects of the present invention will hereinafter appear.

In the accompanying drawing there is portrayed diagrammatically one form of equipment which has been found to be very satisfactory for carrying out the process of this present invention. This equipment will be described in detail below.

In one embodiment, my invention comprises reacting a material containing one or more aliphatic conjugated diolefins and one or more alicyclic conjugated diolefins, with or without other hydrocarbons, with sulfur dioxide under such conditions as to convert the aliphatic conjugated diolefin content to monosulfones thereof and the alicyclic conjugated diolefins to polysulfones thereof. Preferably the conversion of the diolefin content to sulfones is carried out in such manner that both the aliphatic and the alicyclic conjugated diolefins are converted simultaneously to their respective sulfones. The reaction material may then be treated in order to separate the monosulfone and the polysulfone contents from any other material and preferably from one another. The separation of the monosulfone from the polysulfone may desirably be effected by heating the sulfone mixture separated from the reaction mixture so as to cause decomposition of the monosulfone into a gaseous mixture of aliphatic conjugated diolefin and sulfur dioxide without substantially affecting the polysulfone of the alicyclic conjugated diolefin. The gaseous product resulting from the decomposition of the monosulfone content may then be readily treated in such manner as to separate the aliphatic conjugated diolefin in a high state of purity from the sulfur dioxide which may conveniently be recycled to the initial reaction step.

Alternatively the separation of the monosulfone from the polysulfone may be effected by subjecting the sulfone mixture separated from the reaction mixture to mechanical treatment at a temperature above the melting point of the monosulfone but below its decomposition point, and therefore below the decomposition point of the polysulfone, to physically separate the liquid monosulfone from the solid polysulfone. For example, this may conveniently be done by filtration or centrifuging, or the like.

The invention is particularly applicable to the separation of aliphatic conjugated pentadienes from cyclopentadiene, other $C_5$ hydrocarbons, such as pentanes or pentenes, being present in or absent from the mixture. Thus, while isoprene, high-boiling piperylene, low-boiling piperylene and cyclopentadiene boil at 34.1°, 44.1°, 42.1°, and 40.2° C., respectively, the sulfone of isoprene melts at 63° C., the sulfone of piperylene is liquid at normal temperatures, and the sulfone of cyclopentadiene is a polymer material which is solid even at temperatures as high as 180° C. In addition, the monosulfones of isoprene and of piperylene begin to decompose at substantial rates at temperatures of from about 100° to about 125° C. to liberate the pentadiene, whereas the cyclopentadiene-polysulfone decomposes at a very high temperature, namely in the neighborhood of 180° C.

I have found that the reaction of cyclopentadiene and the aliphatic conjugated pentadienes such as isoprene, or the piperylenes, with sulfur dioxide can be readily effected in such a manner as to result in the simultaneous formation of cyclopentadiene-polysulfone and monosulfones of the aliphatic conjugated pentadienes. Preferably the reaction is carried out under conditions in which inhibiting effects cause conversion of the alphatic conjugated pentadiene predominantly or exclusively to monosulfones without formation of any appreciable amounts of polysulfone of the aliphatic conjugated pentadienes. These inhibiting effects may be produced by the addition of known inhibitors, such as hydroquinone, pyrogallol, pyrocatechol, etc., to the hydrocarbon mixture being treated, or by the use of a sufficiently elevated reaction temperature, namely above at least about 100° C. In this way formation of polysulfone of the aliphatic conjugated pentadiene is prevented without inhibiting formation of the polysulfone of the cyclopentadiene impurity in the hydrocarbon mixture being treated.

In order to separate the cyclopentadiene-polysulfone from the monosulfone of isoprene and/or piperylene, I may conveniently take advantage of the fact that the monosulfones of isoprene and the piperylenes decompose at from about 100° C. to about 125° C. while the polysulfone of cyclopentadiene is unaffected at these temperatures. I take advantage of this difference in decomposing temperature by effecting decomposition of the aliphatic conjugated pentadiene-monosulfone by heating the mixture of polysulfone and monosulfone at substantially atmospheric pressure and at temperatures within the above mentioned range without accompanying decomposition of the cyclopentadiene-sulfone due to its greater thermal stability. The decomposition products are quickly cooled to from about 25° to about 40° C. to prevent re-reaction, and separated in any suitable manner.

If desired the cyclopentadiene may be recovered by heating the polysulfone separated in the foregoing manner to its decomposition temperature, namely to about 180° C., or thereabove, quickly cooling substantially below 180° C., and separating the cyclopentadiene from the sulfur dioxide.

In another embodiment of the invention, advantage is taken of the solid form of the cyclopentadiene-polysulfone and the liquid form of the aliphatic conjugated pentadiene-monosulfones at ordinary to somewhat elevated temperatures, to effect mechanical separation of the solid from the liquid prior to decomposition of the latter and regeneration of the aliphatic conjugated pentadiene therefrom.

If desired, a large part of the cyclopentadiene in the crude material to be treated in accordance with my invention may be eliminated by thermal dimerization to cause selective dimerization of the cyclopentadiene, followed by separation of the dimer of cyclopentadiene by distillation, since the dimerization of cyclopentadiene proceeds much more rapidly than that of the aliphatic conjugated pentadienes.

Referring to the accompanying drawing, a hydrocarbon stream comprising $C_5$ aliphatic conjugated diolefins and including cyclopentadiene, and which may be derived by means of suitable separation steps from any source, such as for example, from low-pressure pyrolysis of propane or other light hydrocarbons, enters the system via line 1. The stream passes to pump 2, preferably under sufficient pressure to maintain liquid phase at the suction side of pump 2. Sulfur dioxide is introduced into the system through pipe 4 to pump 5, preferably under sufficient pressure to maintain liquid phase. From pump 5 the sulfur dioxide passes through pipe 3A to pipe 3 where it joins the stream of hydrocarbons from pump 2. The combined streams then pass to heater 6. The distance from pumps 2 and 5 to heater 6 should be short. In heater 6 the mixture is heated to a temperature in the range of from room temperature (say 20–30° C.) to about 150° C., sufficient pressure being established by the pumps 2 and 5 to maintain the mixture in the liquid phase at these temperatures. From heater 6, the stream passes via pipe 7 to reaction vessel 9 which is suitably insulated against loss of heat and is equipped with baffles or similar devices to prevent convection. In this heater the mixture is maintained under the conditions of temperatures and pressure established by heater 6 and pumps 2 and 5.

The time during which the reaction mixture is held under the reaction conditions of temperatures and pressure set forth above will vary with the composition of the streams entering, that is, the concentrations of the conjugated diolefins and of the sulfur dioxide, and may range from 10 minutes to 3 hours or longer, say up to 18 hours, depending upon the temperature. A rough estimate of the reaction time required may be made from the reaction velocity equations. However, the proper value for any given proportion of reactants may be readily determined by experiment.

In some cases the reaction time may be so short that the time of passage through heater 6 is sufficient to effect substantially complete conversion of the conjugated dienes present into sulfones. In such case the reaction products leaving heater 6 may be by-passed around reaction vessel 9 by the by-pass line 10.

During reaction, a portion of the sulfones formed may appear as a separate phase containing a small amount of dissolved hydrocarbons and a large amount of sulfur dioxide. This bottom layer may be removed from reaction vessel 9 as soon as formed via line 16 and control valve 17 operated by liquid level control 15 to pipe 21. If the sulfone layer comprises appreciable quantities of unreacted hydrocarbons, it will be desirable to pass it via line 36 to separator 14 wherein separation of the unreacted hydrocarbons may be effected. The level of the sulfone layer in reaction vessel 9 is kept low to minimize undesirable secondary reactions of the sulfones which might result from their high concentration under the prevailing conditions.

The unreacted material in reaction vessel 9 and which contains dissolved sulfone, passes via line 12 controlled by reducing valve 13 to separator 14 wherein the unreacted hydrocarbons and the sulfur dioxide are removed from the sulfones. The unreacted materials, after the separation of the sulfones, may be recycled to the suction of pump 5 via lines 22 and 22A. The sulfones may be separated from the unreacted material by any suitable means, for example, by vaporizing the sulfur dioxide and any unreacted hydrocarbons and recovering the non-volatile sulfones as a residual material, or by cooling the stream to a temperature at which the sulfones separate. The sulfones separated in unit 14 leave via line 24 and merge with the sulfones in line 21. The combined sulfones are passed via line 21 to the decomposition unit 25 wherein the mixture is heated to a temperature in the range of from about 100° to about 125° C. or higher, at a pressure of about atmospheric, for a time sufficient to effect decomposition selectively of the aliphatic pentadiene-mono-sulfone content. The cyclopentadiene-polysulfone is removed via line 26. The polysulfone may deposit in unit 25 and require a continuous scraper or equivalent means for removing in a form to be conveniently discharged. The vapors of sulfur dioxide and aliphatic pentadiene, resulting from the thermal decomposition of the aliphatic pentadiene-monosulfone content in unit 25, passes via line 28 through a condenser 29 to separator 30 in which the sulfur dioxide is separated from the aliphatic conjugated pentadiene in any suitable manner, as by fractional distillation, oil or water scrubbing, or the like. The sulfur dioxide so recovered is recycled, if desired, to the suction of pump 5 via lines 31 and 22A.

The aliphatic conjugated pentadienes are removed in a concentrated form and substantially free from cyclic hydrocarbons and other hydrocarbons, via line 34. If the aliphatic pentadiene so recovered comprises a mixture of isoprene and piperylene, these may be separated from one another by fractional distillation or in any other suitable manner, if desired.

In another form of my invention, immediately preceding decomposition in unit 25, the mixture of sulfones is subjected to filtration or equivalent means of mechanical separation at a temperature above the monosulfone melting range, usually in the range of from about 30° to about 70° C., but below the temperature of decomposition of the monosulfone, to effect separation of the liquid, aliphatic conjugated pentadiene-monosulfones from the solid cyclopentadiene-polysulfone. The liquid filtrate is then subjected to thermal decomposition as before in decomposition unit 25 at a temperature above the decomposition point of the monosulfone but below the decomposition point of the polysulfone so that any cyclopentadiene-polysulfone entrained in or dissolved in the monosulfone is not decomposed.

While the foregoing disclosure refers specifically to the separation of cyclopentadiene from aliphatic conjugated pentadienes, it is applicable to the separation of any alicyclic conjugated diolefin which will form the polysulfone under similar conditions, for example cyclohexadiene, cycloheptadiene, alkyl derivatives of the alicyclic conjugated diolefins, such as methylcyclopentadiene, methylcyclohexadiene, etc. from any aliphatic conjugated diolefin, for example, butadiene, hexadiene, etc.

In carrying out my invention, I prefer to use an excess of sulfur dioxide, say from about 2 to about 10 moles of SO₂ per mole of conjugated diolefin content in the initial reaction mixture. The reaction may be carried out by heating the reaction mixture to from about 30° to about 300° C., and preferably from about 100° to about 150° C., under pressure sufficient to maintain the reaction mixture in liquid form, under conditions such as, and for a period of time sufficient, to substantially completely convert the alicyclic conjugated diolefin content selectively to polysulfone and the aliphatic conjugated diolefin content selectively to monosulfone.

I claim:

1. The method of recovering substantially pure aliphatic conjugated pentadiene from a mixture containing the same and also containing cyclopentadiene which comprises heating said mixture with a molecular excess of sulfur dioxide over the pentadiene content of the mixture to a temperature of from 30° to 150° C. under a pressure more than sufficient to liquefy the SO₂ at the temperature used for a period of time such that substantially complete conversion of the cyclopentadiene content of the mixture to cyclopentadiene polysulfone is effected and conversion of aliphatic conjugated pentadiene to the corresponding monosulfone is effected, separating a mixture of said polysulfone and said monosulfone from the reaction mixture, and heating said mixture of polysulfone and said monosulfone at a temperature of from 100 to 125° C. at substantially atmospheric pressure and thereby effecting decomposition of said monosulfone to said aliphatic conjugated pentadiene and sulfur dioxide without accompanying decomposition of said polysulfone, separating the gaseous reaction products and separating the substantially pure aliphatic conjugated pentadiene from the sulfur dioxide.

2. The method of recovering substantially pure aliphatic conjugated pentadiene from a mixture containing the same and also containing cyclopentadiene which comprises heating said mixture with a molecular excess of sulfur dioxide over the pentadiene content of the mixture to a temperature of from 100° to 150° C. under a pressure more than sufficient to liquefy the SO₂ at the temperature used for a period of time such that substantially complete conversion of the cyclopentadiene content of the mixture to cyclopentadiene polysulfone is effected and substantially complete conversion of aliphatic conjugated pentadiene to the corresponding monosulfone is effected, separating a mixture of said polysulfone and said monosulfone from the reaction mixture, and heating said mixture of polysulfone and said monosulfone at a temperature of from 100 to 125° C. at substantially atmospheric pressure and thereby effecting decomposition of said monosulfone to said aliphatic conjugated pentadiene and sulfur dioxide without accompanying decomposition of said polysulfone, separating the gaseous reaction products and separating the substantially pure aliphatic conjugated pentadiene from the sulfur dioxide.

3. The method of recovering substantially pure aliphatic conjugated pentadiene from a mixture containing the same and also containing cyclopentadiene which comprises heating said mixture with a molecular excess of sulfur dioxide over the pentadiene content of the mixture to a temperature of from 100° to 150° C. in the absence of an inhibitor preventing the formation of polysulfone of said aliphatic conjugated pentadiene under a pressure more than sufficient to liquefy the SO₂ at the temperature used for a period of time such that substantially complete conversion of the cyclopentadiene content of the mixture to cyclopentadiene polysulfone is effected and substantially complete conversion of aliphatic conjugated pentadiene to the corresponding monosulfone is effected, separating a mixture of said polysulfone and said monosulfone from the reaction mixture, and heating said mixture of polysulfone and said monosulfone at a temperature of from 100° to 125° C. at substantially atmospheric pressure and thereby effecting decomposition of said monosulfone to said aliphatic conjugated pentadiene and sulfur dioxide without accompanying decomposition of said polysulfone, separating the gaseous reaction products and separating the substantially pure aliphatic conjugated pentadiene from the sulfur dioxide.

4. The method of recovering substantially pure aliphatic conjugated pentadiene from a mixture containing the same and also containing cyclopentadiene which comprises heating said mixture with a molecular excess of sulfur dioxide over the pentadiene content of the mixture to a temperature of from 30° to 100° C. and in the presence of an inhibitor preventing the formation of polysulfone of said aliphatic conjugated pentadiene under a pressure more than sufficient to liquefy the $SO_2$ at a temperature used for a period of time such that substantially complete conversion of the cyclopentadiene content of the mixture to cyclopentadiene polysulfone is effected and substantially complete conversion of aliphatic conjugated pentadiene to the corresponding monosulfone is effected, separating a mixture of said polysulfone and said monosulfone from the reaction mixture, and heating said mixture of polysulfone and said monosulfone at a temperature of from 100° to 125° C. at substantially atmospheric pressure and thereby effecting decomposition of said monosulfone to said aliphatic conjugated pentadiene and sulfur dioxide without accompanying decomposition of said polysulfone, separating the gaseous reaction products and separating the substantially pure aliphatic conjugated pentadiene from the sulfur dioxide.

FREDERICK E. FREY.